March 26, 1968 — C. E. PALMER ET AL — 3,374,896

FILTER BED AGITATOR

Filed Oct. 31, 1966 — 3 Sheets-Sheet 1

INVENTORS
CHARLES E. PALMER
BY ROBERT H. PALMER

Charles L. Lovercheck
attorney

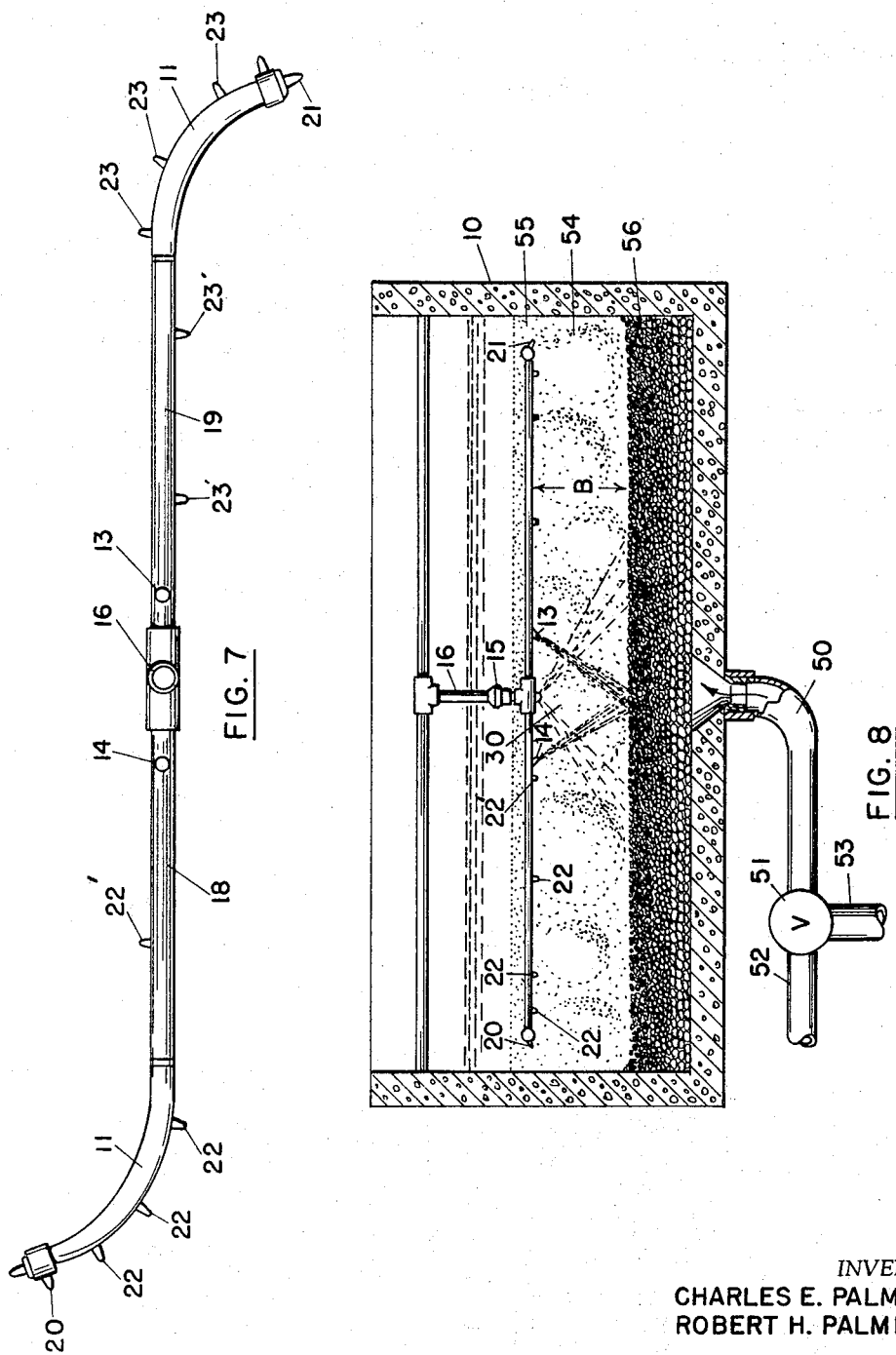

March 26, 1968 C. E. PALMER ETAL 3,374,896
FILTER BED AGITATOR
Filed Oct. 31, 1966 3 Sheets-Sheet 3
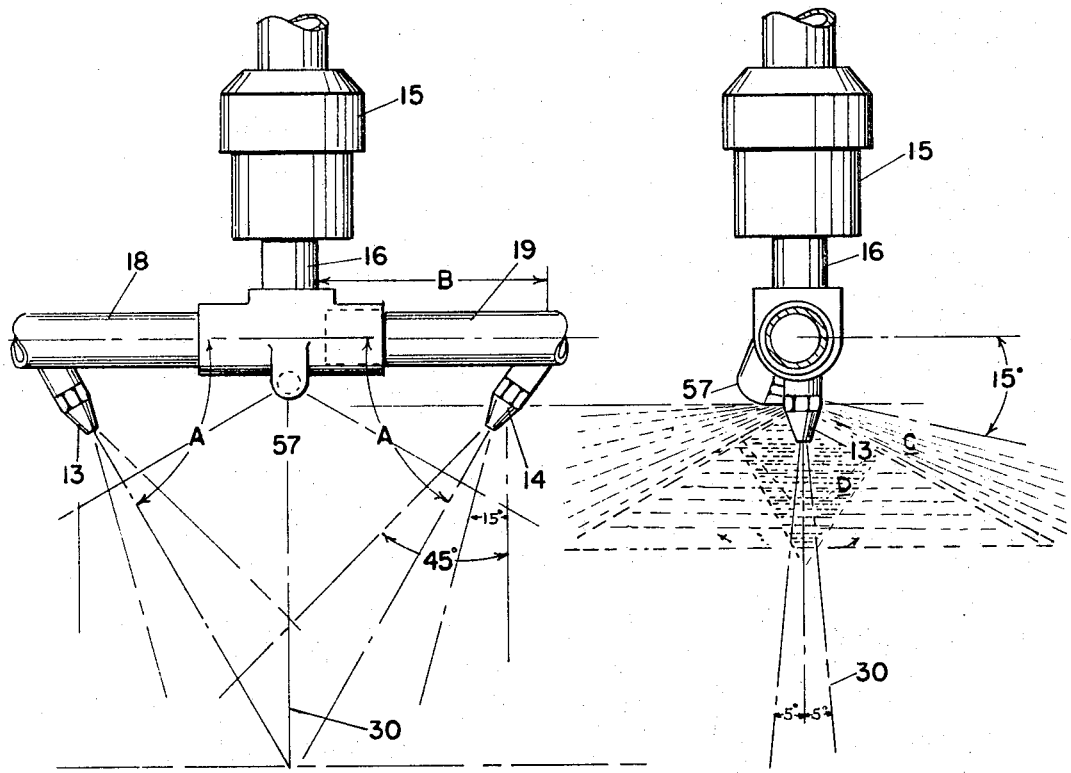
FIG. 9
FIG. 10
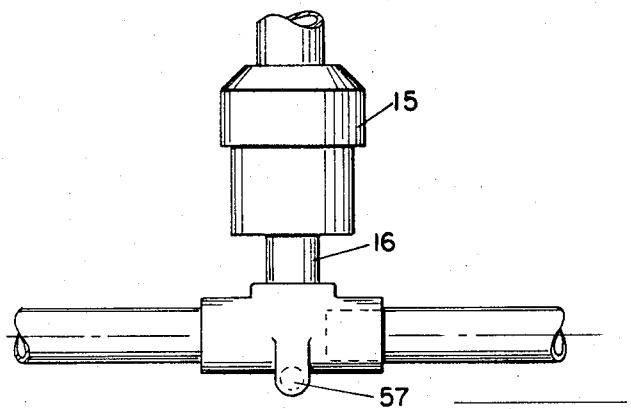
FIG. 11
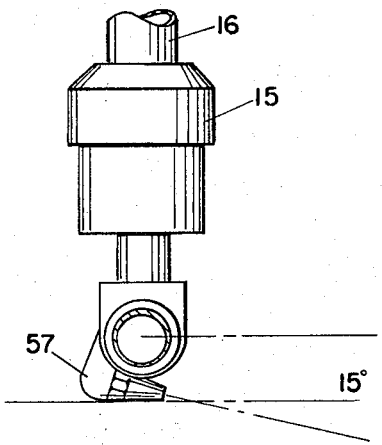
FIG. 12
INVENTORS
CHARLES E. PALMER
ROBERT H. PALMER
BY
ATTORNEY United States Patent Office 3,374,896
Patented Mar. 26, 1968

3,374,896
FILTER BED AGITATOR
Charles E. Palmer and Robert H. Palmer, Fairview, Pa., assignors to Palmer Filter Equipment Company, Erie, Pa., a corporation of Pennsylvania
Continuation-in-part of application Ser. No. 553,936, May 31, 1966, which is a continuation-in-part of application Ser. No. 147,648, Oct. 25, 1961. This application Oct. 31, 1966, Ser. No. 590,816
1 Claim. (Cl. 210—272)

ABSTRACT OF THE DISCLOSURE

A self-propelled filter bed agitator comprising a horizontally rotatable arm supported at its center above the bed, nozzle means on opposite sides of the arm and the center to rotate the arm and agitate the bed and two nozzles on opposite sides of the center and directed downwardly inwardly to agitate the area of the bed directly below the center.

This application is a continuation-in-part of patent application Ser. No. 553,936, filed May 31, 1966, now abandoned, which is a continuation-in-part of patent application Ser. No. 147,648, filed Oct. 25, 1961, now abandoned.

This invention relates to filter beds and, more particularly, to the type of filter bed agitator for agitating the granular material in a water treatment filter bed.

In the aforesaid application, an S-shaped filter agitator arm is shown suitable for efficiently agitating the corner areas of square filter beds. Such a filter, as well as previous filters, however, leaves an unagitated area of the bed directly under the center of rotation of the arm. This area may contain a cone shaped amount of filter material which when mixed with clay or other material that may form a binder with the sand, may lie unagitated under the center of the arm.

The present invention provides an improved means for agitating this central area and to break up the characteristic mound of filter material.

It is, accordingly, an object of the present invention to provide an improved filter bed agitator.

Another object of the invention is to provide a filter bed agitator which will agitate the filter material directly below the center of the agitator.

A further object of the invention is to provide a filter bed agitator which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawings:

FIG. 7 is a top view of the agitator arms;

FIG. 8 is a cross sectional view showing the bed expanded as it would be during a backwash cycle; and FIGS. 9, 10, 11, and 12 are enlarged views showing the center agitating nozzles.

Figure 1:
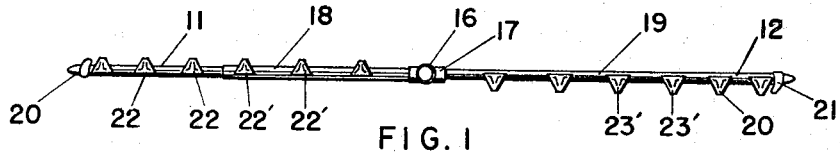
FIG. 1 is a bottom view of an agitator arm according to the invention.

Now with more particular reference to the drawings, the arm is shown supported on a support pipe 16 which also acts as a liquid supply pipe for the agitator arm. A rotatable bearing 15 supports the arm. The arm is made up of a first straight portion 18 and a second straight portion 19. Connected to the straight portions are a first curved portion 11 and a second curved portion also indicated at 11, which curve outwardly and, with the straight portions, define an S-shaped arm with the support pipe 16 supporting it at the center.

A first jet 13 is directed downwardly and toward the center of the filter at an angle of approximately thirty degrees and a second jet or nozzle 14 is likewise directed toward the center at an angle A to the vertical. The first and second jets are likewise directed rearwardly at an angle of approximately five degrees so that the streams from these jets do not meet but pass each other as shown at 31 in FIG. 10.

Intermediate nozzles 22' and 23' are disposed on the trailing edges of the straight part of the arm and they incline downwardly and rearwardly to agitate the fluid below them. Nozzles 22 and 23 are located on the trailing edge of the curved part of the arm.

Without the central nozzles 13 and 14, a conical unagitated pile of granular material remains at 30 whereas with the present arrangement of the nozzles 13 and 14, this central conical pile is thoroughly agitated and broken up and the material in the bed is thoroughly agitated.

End nozzles 20 and 21 are directed tangentially and downwardly and rearwardly of the curved portion to agitate the material in the corners and to supply a propelling component for the arm to rotate it in a rotary path.

The filter bed is shown supported in a tank 10 which is typical of rapid sand filters, and which may be of concrete or the like and has a drain 50 from the lower end thereof which, during normal filtering operation, would convey water from the tank to a city main or the like. A valve 51 can be adjusted to direct water through pipe 52 to a city main or it could be directed to convey water from a source indicated at 53 to backwash the filter.

The filter bed is generally made up of relatively fine sand 54 which may be approximately 24 inches deep and a top layer of crushed coal 55 is shown supported on top of the sand. At the bottom of the tank are several successive layers of gravel indicated at 56 which will be coarse gravel in the bottom and progressively fine layers on top thereof.

Figure 2:
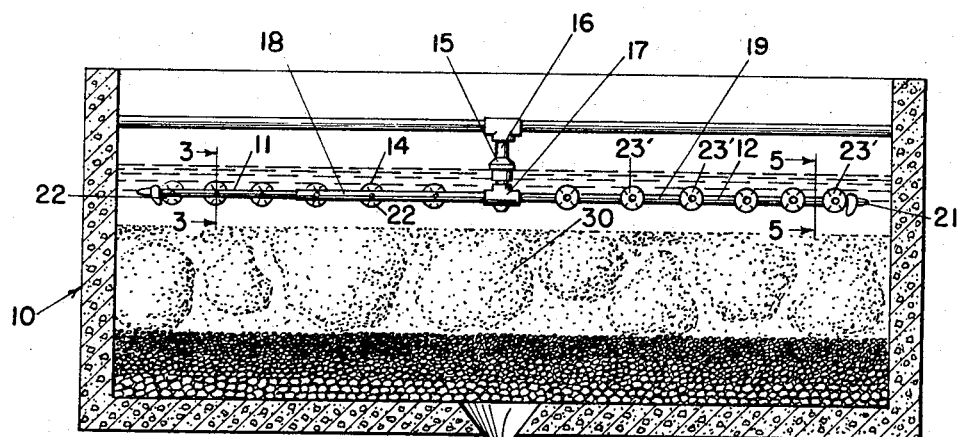
FIG. 2 is a vertical cross sectional view of a filter bed showing the bed settled down below the agitator arm in the position it would be during the filtering cycle.

The agitator arm is supported above the bed as indicated in FIG. 2 approximately two inches so that the arm can rotate very slightly above the top of the bed when the bed is in its unexpanded position.

The arm as indicated has the nozzles 13 and 14 directed toward the center and it also has a nozzle 57 which is directed along the top of the bed and is a nozzle identical to nozzle 34a shown in Patent No. 2,309,917. It will be noted that this nozzle is inclined to the horizontal at an angle of approximately fifteen degrees.

The venturi members 14' are supported over the nozzles and they have a frusto-conical shaped body 31 flared outwardly at the outlet 36 with the hole 32 through the nozzle and attached to the pipe 19 as indicated. A spider 23 supports the nozzle and venturi together and a flared inlet 30 allows water to be drawn in at 34 past the spider members 27 which are clamped at 36 between the nozzle and a nut 22". The discharge from the nozzle at 20 passes out through the venturis. Thus, as sand and water are drawn through the venturis by the jet action of the nozzle, the sand is agitated and scrubbed.

Figure 6:
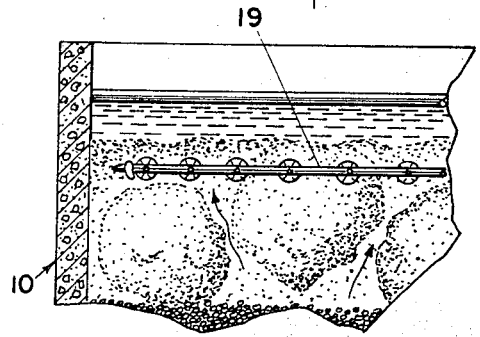
FIG. 6 is a partial view similar to FIG. 2 showing the bed being backwashed.
Figure 3:
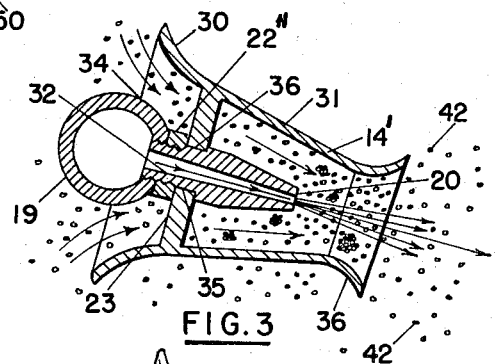
FIG. 3 is an enlarged view of the venturi cones which are supported around the nozzle.
Figure 5:
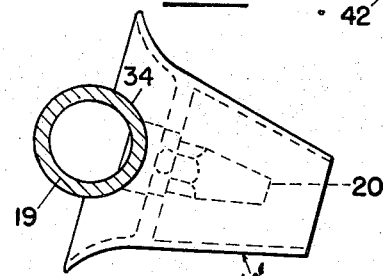
FIG. 5 is a view similar to FIG. 3 showing the outline of the venturi.
Figure 4:
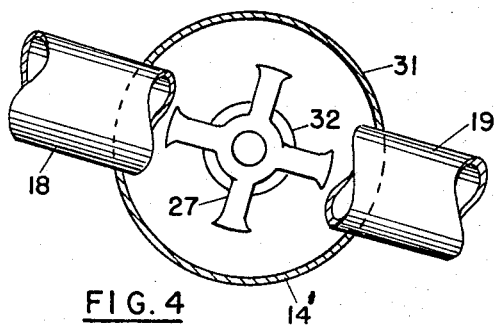
FIG. 4 is a broken view partly in cross section of the venturi cone.

A well known phenomenon in the rapid filter art is the formation of mud balls. These mud balls are formed by various clays that are entrained in the filter sand and cause the sand to adhere together into an impervious mass. When the filter is backwashed, the bed is expanded as indicated in FIG. 6 and the arm rotates around in the sand and the jets on the arm act to propel the arm and to agitate the sand. In previous filter arms, no jets similar to the nozzles 13 and 14 were provided and the center of the filter caked up. In this application, these nozzles break up the conical formation of sand directly below the center of the filter arm and thereby increase the efficiency of the filter.

A filter arm such as shown in this disclosure including nozzle 57 but not including nozzles 13 and 14 has been in use for many years in filter plants all over the country. With these filter arms mud balls are formed in the unagitated region directly below the axis of rotation of the arm. This resulted in a dead zone below the axis of rotation which grew in size with use of the filters until a substantial percentage of the filter became a "dead zone" and the filter material had to be removed and regraded.

Since the nozzle 57 is located on the axis of rotation of the arm it was impossible to direct it at such an angle as to agitate the filter medium directly below the axis of rotation.

It has been discovered that the zone below the axis of rotation of the arm in a filter bed can be agitated by the use of nozzles 13 and 14. The usual filter has a bed of a depth of 24 inches to 36 inches. Nozzles 13 and 14 are attached to the arms 18 and 19 at a spacing of about six inches from the axis of rotation of the arm for a 24 inch bed and a spacing of about nine inches for a 36 inch bed; that is, approximately one fourth the bed depth. The nozzles must be disposed at an angle of between 15 degrees and 45 degrees to the vertical, that is an angle of from 75 degrees to 45 degrees to the horizontal.

This is because the fluid passes from a nozzle in a conical path. Also fluid discharged from a nozzle in a liquid medium loses its velocity rapidly at distances from the nozzle. If the nozzle is disposed at an angle of less than 45 degrees to the plane of rotation of this arm it will be virtually ineffective on the material directly below the arm at any appreciable depth. Thus, if the nozzles 13 and 14 are spaced from the axis more than the nine inches mentioned and are directed inward at angles less than 45 degrees to the plane of rotation, the nozzles will have little effect on the filter material near the bottom of the bed.

On the other hand if the nozzles 13 and 14 are pointed downward at angles greater than 75 degrees to the plane of rotation, they will impinge on an area below the axis of too small a diameter to be practical and will not cover the desired area.

FIG. 9 illustrates how the nozzles 13 and 14 break up the concial zone B at the bottom of the filter bed at the center when arranged between 45 and 15 degrees to the vertical while nozzles 57 break up the zone C above this conical zone.

The conical zone indicated at B will in the absence of nozzles 13 and 14 form in the space directly below the axis of rotation of the arm. Changing the angle of nozzle 57 will only serve to steepen the angle of the sides of this conical zone.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

1. A filter bed and agitator combination comprising
    a tank,
    a bed of granular filter material of a predetermined depth in said tank,
    liquid in said tank,
    a hollow arm,
    means supporting said arm at its center and disposed approximately two inches from the top of said granular material when in filtering position and disposed in said granular material during the backwish cycle,
    said arm being rotatable in said tank in a horizontal plane,
    first jet nozzles on said arm extending therefrom on a first side of said support means in a first direction and second jet nozzles extending from said arm in a second direction on a second side of said support means whereby said jet nozzles project liquid rearwardly to propel said arm,
    a first downwardly directed nozzle on said arm, second downwardly directed nozzle being attached to said arm on the side of said center remote from said first downwardly directed nozzle and projecting rearwardly at an angle of approximately five degrees to a vertical line, said first and second downwardly directed nozzles being spaced from said center approximately one fourth the said bed depth and directed inwardly at an angle of 15 degrees to 45 degrees to a vertical line through the center of said support means, whereby said first and second downwardly directed nozzles agitate said granular material in the area directly below said support means,
    and means to supply liquid under pressure to the center of said arm to flow through said nozzles.

References Cited

UNITED STATES PATENTS

| 1,098,811 | 6/1914 | Loebel et al. | 259—95 |
| 2,309,917 | 2/1943 | Palmer | 210—272 |
| 3,039,612 | 6/1962 | Palmer et al. | 210—272 |

FOREIGN PATENTS

| 1,142,557 | 4/1957 | France. |

SAMIH N. ZAHARNA, *Primary Examiner.*